United States Patent
Scaringe et al.

(10) Patent No.: US 10,479,427 B2
(45) Date of Patent: Nov. 19, 2019

(54) SYSTEMS AND METHODS FOR MODULAR COMPONENTS FOR ELECTRIC VEHICLES

(71) Applicant: Rivian IP Holdings, LLC, Livonia, MI (US)

(72) Inventors: Robert J. Scaringe, Plymouth, MI (US); David Schneider, Glendale, CA (US); Larry J. Parker, Bloomfield Hills, MI (US); Chass Bakker, Ortonville, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

(21) Appl. No.: 15/403,870

(22) Filed: Jan. 11, 2017

(65) Prior Publication Data

US 2017/0197679 A1    Jul. 13, 2017

Related U.S. Application Data

(60) Provisional application No. 62/277,954, filed on Jan. 12, 2016.

(51) Int. Cl.
*B62D 63/02* (2006.01)
*B62D 21/09* (2006.01)
(Continued)

(52) U.S. Cl.
CPC .......... *B62D 63/025* (2013.01); *B60G 13/10* (2013.01); *B60K 1/00* (2013.01); *B60K 1/02* (2013.01);
(Continued)

(58) Field of Classification Search
CPC .................. B62D 27/06; B62D 63/025; B62D 2410/111; B62D 21/12; B62D 21/09;
(Continued)

(56) References Cited

U.S. PATENT DOCUMENTS 2,512,798 A * 6/1950 Hodges ................. B60P 1/6409
104/48
3,897,100 A * 7/1975 Gardner ................... B60J 7/041
296/10

(Continued)

FOREIGN PATENT DOCUMENTS

WO     2014/194409 A1    12/2014
WO     WO-2014194409 A1 * 12/2014  ............. B60L 15/20

OTHER PUBLICATIONS

Patent Cooperation Treaty, International Search Report, PCT/US2017/012974, dated Apr. 4, 2017.

(Continued)

*Primary Examiner* — Saul Rodriguez
*Assistant Examiner* — Ashley K Romano
(74) *Attorney, Agent, or Firm* — Jones Day

(57) ABSTRACT

A modular system for an automotive vehicle configured to permit removal of a removable structural module from and reattachment to an automotive vehicle is described. The system includes a removable structural module comprising a body, a support structure configured to receive and support the removable structural module and to permit the removable structural module to be releasably attached to an automotive vehicle, a sensing arrangement configured to permit confirmation of secure attachment of the removable structural module to the automotive vehicle and configured to permit identification of a predetermined type of the removable structural module, and a computer configured to identify the predetermined type of the removable structural module from among multiple possible predetermined types of removable structural modules. The removable structural module comprises multiple connecting structures that permit the removable structural module to be releasably secured to the automotive vehicle.

24 Claims, 7 Drawing Sheets

Structural vehicle modular system with automatic identification of the predetermined type/category of attachable/removable structural module 120

(51) Int. Cl.
    *B62D 21/12*     (2006.01)
    *B62D 27/06*     (2006.01)
    *B60G 13/10*     (2006.01)
    *B60K 1/02*     (2006.01)
    *B60K 1/04*     (2019.01)
    *B60K 1/00*     (2006.01)
    *B60K 17/354*     (2006.01)
    *B60K 17/356*     (2006.01)
    *B60P 3/42*     (2006.01)

(52) U.S. Cl.
    CPC .............. B60K 1/04 (2013.01); B60K 17/354 (2013.01); B60K 17/356 (2013.01); B62D 21/09 (2013.01); B62D 21/12 (2013.01); B62D 27/06 (2013.01); *B60G 2400/95* (2013.01); *B60G 2401/16* (2013.01); *B60G 2500/10* (2013.01); *B60G 2500/30* (2013.01); *B60K 2001/001* (2013.01); *B60K 2001/0438* (2013.01); *B60P 3/42* (2013.01); *B60Y 2200/90* (2013.01); *B60Y 2300/045* (2013.01); *B60Y 2410/111* (2013.01)

(58) Field of Classification Search
    CPC .......... B60Y 2200/90; B60Y 2410/111; B60Y 2300/045; B60G 2400/95; B60G 13/10; B60G 2401/16; B60G 2500/30; B60K 1/00; B60K 1/02; B60K 1/04; B60K 17/354; B60K 17/356; B60K 2001/001; B60K 2001/0438; B60P 3/42
    See application file for complete search history.

(56) References Cited

U.S. PATENT DOCUMENTS

| | | | | |
|---|---|---|---|---|
| 4,810,158 | A * | 3/1989 | Bitzer | B60J 7/106 16/45 |
| 4,842,326 | A * | 6/1989 | DiVito | B60P 3/42 296/10 |
| 5,470,124 | A * | 11/1995 | Ernst | B60J 7/022 296/100.04 |
| 5,707,101 | A * | 1/1998 | Rice | B60J 1/1884 296/146.15 |
| 5,785,485 | A * | 7/1998 | Hall | B60P 1/6427 414/478 |
| 6,059,058 | A * | 5/2000 | Dower | B60K 1/04 180/298 |
| 6,312,034 | B1 * | 11/2001 | Coleman, II | B60P 1/003 296/26.09 |
| 7,107,129 | B2 * | 9/2006 | Rowe | A62C 27/00 169/24 |
| 7,303,033 | B2 * | 12/2007 | Chernoff | B62D 63/025 180/65.1 |
| 7,441,615 | B2 * | 10/2008 | Borroni-Bird | B60G 3/18 180/402 |
| 7,714,708 | B2 * | 5/2010 | Brackmann | B60P 3/14 180/290 |
| 8,727,426 | B2 * | 5/2014 | Vitale | B62D 21/14 296/193.04 |
| 8,925,777 | B1 * | 1/2015 | Casucci | B60R 9/065 224/404 |
| 9,327,632 | B1 * | 5/2016 | Bartel | B60P 1/34 |
| 9,809,096 | B1 * | 11/2017 | DeMonte | B60J 7/065 |
| 9,845,123 | B2 * | 12/2017 | Byrnes | B62D 63/025 |
| 2003/0123965 | A1 * | 7/2003 | Brackmann | B60P 3/03 414/467 |
| 2007/0173987 | A1 | 7/2007 | Rowe et al. | |
| 2015/0057839 | A1 | 2/2015 | Chang et al. | |
| 2015/0180710 | A1 | 6/2015 | Cazanas et al. | |
| 2015/0217780 | A1 | 8/2015 | Chen et al. | |
| 2017/0197678 | A1 | 7/2017 | Scaringe | |

OTHER PUBLICATIONS

Patent Cooperation Treaty, Written Opinion of the International Searching Authority, PCT/US2017/012974, dated Apr. 4, 2017.
Office Action dated Apr. 18, 2018 in copending U.S. Appl. No. 15/403,868, 16 pages.

* cited by examiner

Structural vehicle modular system with automatic identification of the predetermined type/category of attachable/removable structural module 120

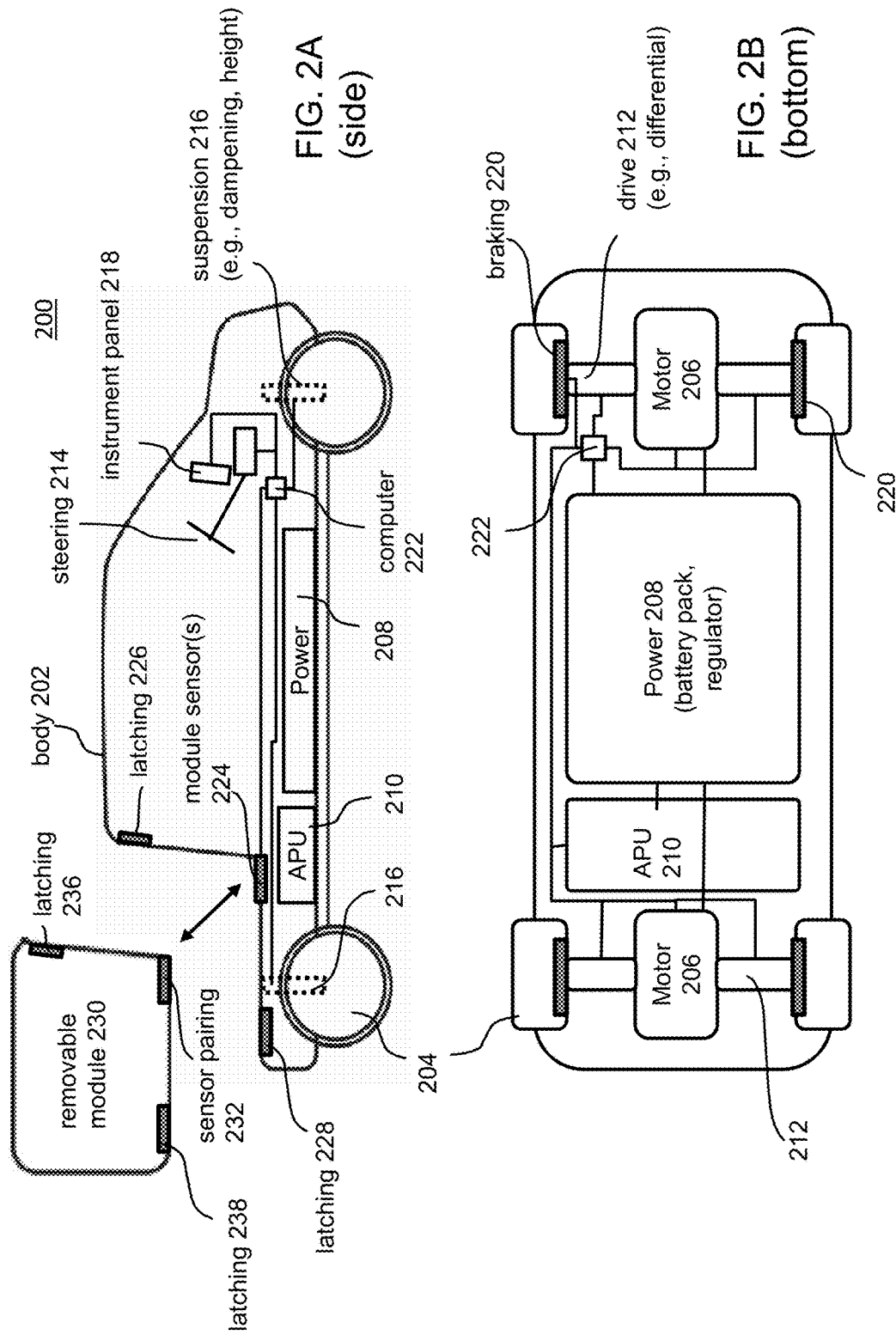

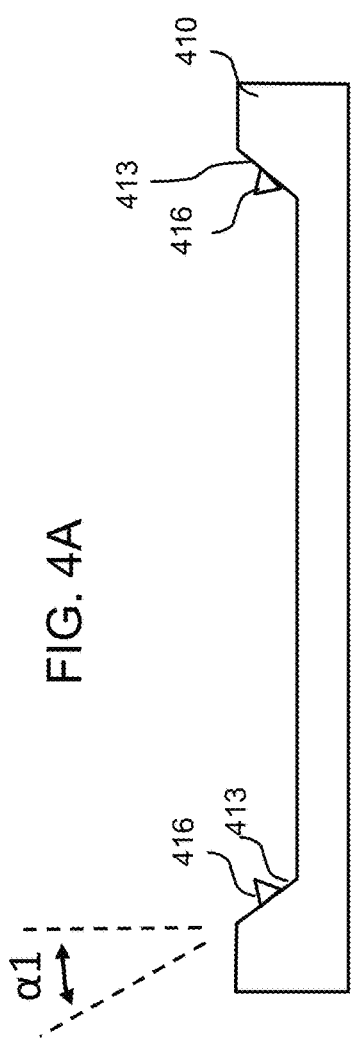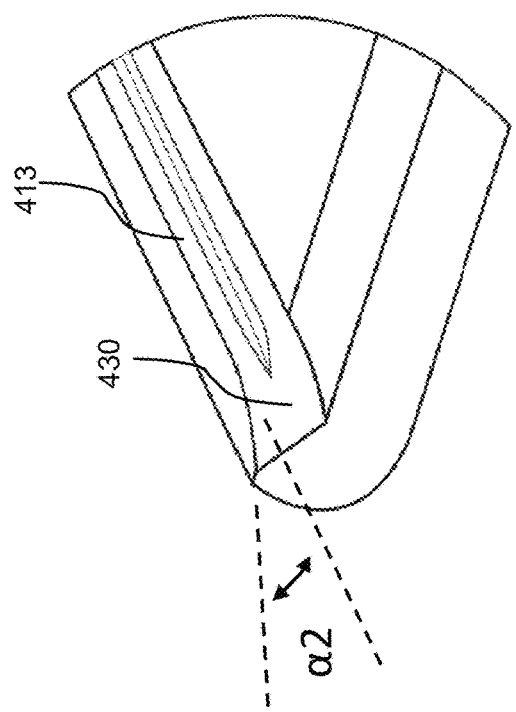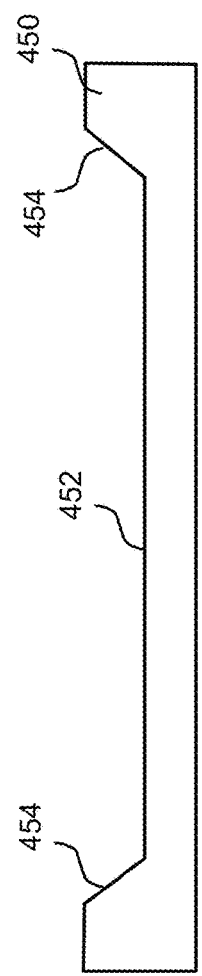

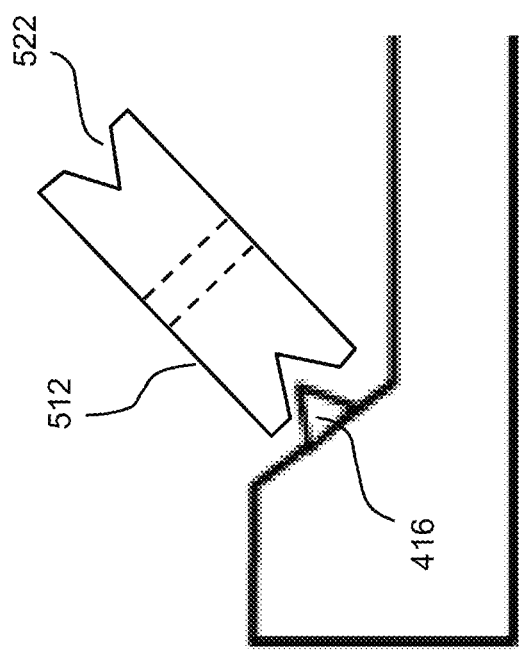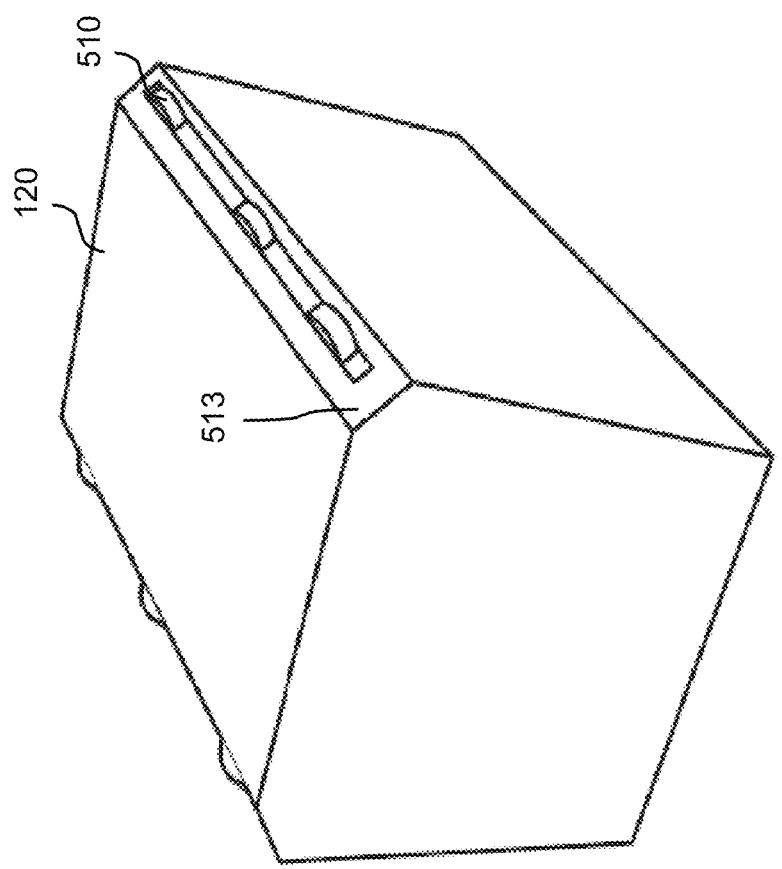

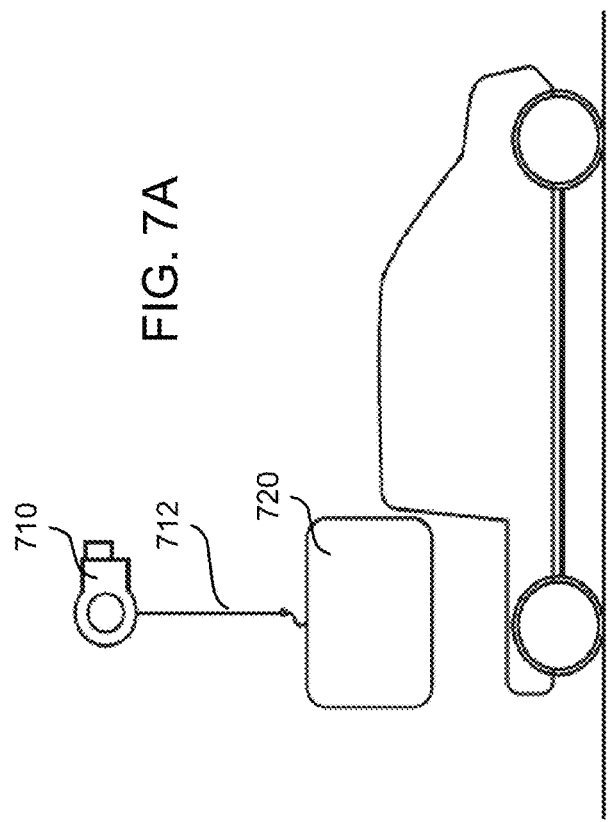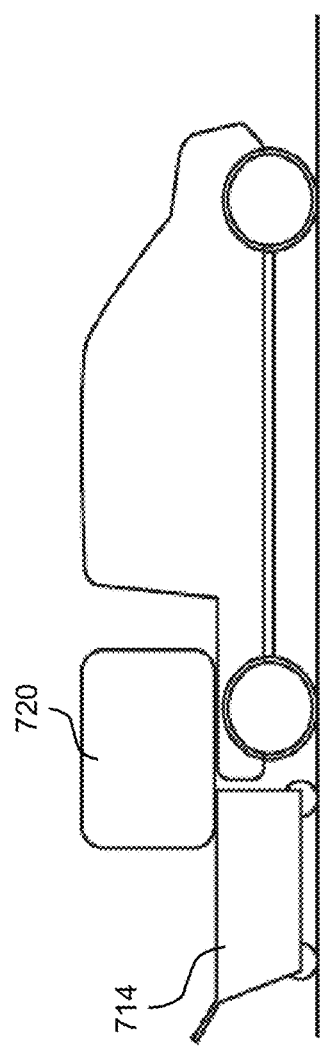

SYSTEMS AND METHODS FOR MODULAR COMPONENTS FOR ELECTRIC VEHICLES

This application claims the benefit of U.S. Provisional Patent Application No. 62/277,954 filed Jan. 12, 2016 entitled "Systems and Methods for Modular Components for Electric Vehicles," the entire contents of which are incorporated herein by reference.

BACKGROUND

Field of the Disclosure

The present disclosure relates to vehicles, such as electric vehicles, including hybrid vehicles and more particularly to systems and methods for efficient utilization of vehicles, such as electric vehicles including hybrid vehicles.

Background Information

Electric vehicles, including hybrid vehicles, are of great interest for transportation applications and can provide benefits of low or zero emissions, quiet operation and reduced dependence upon fossil fuels. The present inventors have observed, however, that conventional electric vehicles have relatively low rates of utilization and are structurally and technologically limited in their applicability to different types of uses.

SUMMARY

The present inventors have observed a need for an electric automotive vehicle that can be structurally and reversibly reconfigured for different types of vehicle uses through the provision of preconfigured, removable structural modules that can be attached to and carried by the vehicles. Such modules can provide the ability to structurally and reversibly configure a single automotive vehicle as a utility haul vehicle, a recreational vehicle, and a delivery vehicle to name a few. When outfitted in one of multiple predetermined structural configurations, the vehicle can detect the particular structural configuration and automatically set one of multiple predetermined feature sets corresponding to the particular structural configuration. Such feature sets may include for example, certain suspension characteristics appropriate for the particular structural configuration of the vehicle, such as, e.g., particular settings for firmness of ride of the vehicle, braking performance/sensitivity, nominal suspension height, effective steering ratio, etc. The present inventors have determined that such technological enhancements to electric vehicles can provide for enhanced utilization of electric vehicles. Exemplary approaches described herein may address such needs.

According to an example, a modular system for an automotive vehicle configured to permit removal of a removable structural module from and reattachment to an automotive vehicle is described. The system includes a removable structural module comprising a body, a support structure configured to receive and support the removable structural module and to permit the removable structural module to be releasably attached to an automotive vehicle, a sensing arrangement configured to permit confirmation of secure attachment of the removable structural module to the automotive vehicle and configured to permit identification of a predetermined type of the removable structural module, and a computer configured to identify the predetermined type of the removable structural module from among multiple possible predetermined types of removable structural modules. The removable structural module comprises multiple connecting structures that permit the removable structural module to be releasably secured to the automotive vehicle.

BRIEF DESCRIPTION OF THE FIGURES

FIG. 2A illustrates a block diagram in side view of an exemplary reconfigurable electric vehicle according to an example of the disclosure.

FIG. 2B illustrates a block diagram in bottom view of the exemplary reconfigurable electric vehicle of FIG. 2A according to an example of the disclosure.

FIG. 4A illustrates an exemplary support structure configured to receive and support a removable structural module for a vehicle according to an example of the disclosure.

FIG. 4B illustrates a portion of the exemplary support structure for a removable structural module shown in FIG. 1A.

FIG. 4C illustrates another exemplary support structure configured to receive and support a removable structural module for a vehicle according to an example of the disclosure.

FIG. 5A illustrates the exemplary removable structural module of FIG. 1B in a bottom-to-top reversed view according to an example of the disclosure.

FIG. 5B illustrates an exemplary roller configuration for an exemplary removable structural module according to an example of the disclosure.

FIGS. 7A and 7B illustrate exemplary approaches for loading and mounting a removable structural module onto a support structure for mounting the module to a vehicle.

DETAILED DESCRIPTION OF EXEMPLARY EMBODIMENTS

Figure 1B:
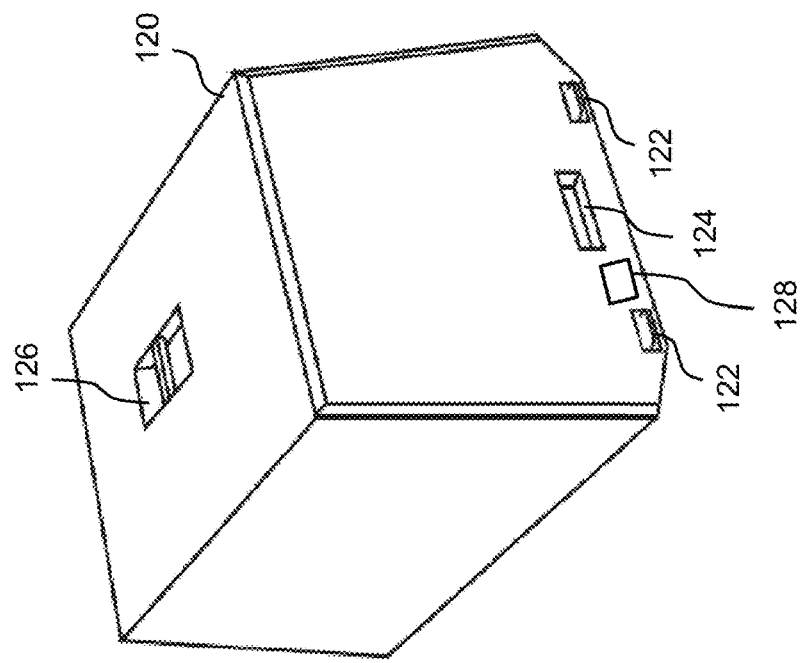
FIGS. 1A and 1B illustrate an exemplary structural vehicle modular system that permits a removable structural module to be removed from and reattached to a vehicle according to an example of the disclosure.
Figure 1A:
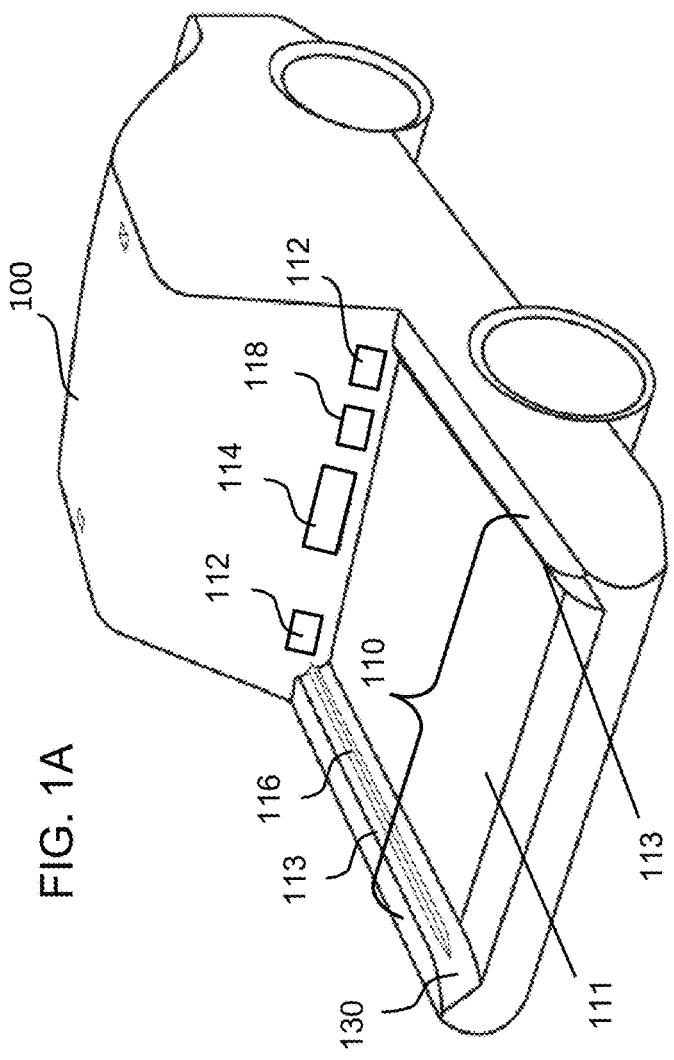

FIGS. 1A and 1B illustrate an exemplary structural vehicle modular system that permits a removable structural module to be removed from and reattached to a vehicle according to an example of the disclosure. As shown in FIG. 1A, a support structure 110 is disposed on a vehicle 100 such as an electric vehicle 100. The electric vehicle 100 is suitable for driving on roadways and may be shared among a plurality of users (drivers) or among a plurality of uses controlled by an entity (owner or other responsible entity) to permit enhanced utilization of the vehicle 100. The vehicle 100 may be configured for driving by a human driver or configured for autonomous driving without a human driver.

The support structure 110 includes a flat area 111 and angled sides 113 that open or spread apart in an upward direction away from the flat surface 110. The support structure also includes in this example a pair of load bearing support rails 116, one at each side of the flat area 111, but only the left hand one of which is visible in FIG. 1A. A removable structural module 120 that may be mounted onto the support structure 110 is shown in FIG. 1B. The removable structural module includes a body which in this example includes multiple sides and one or more access doors or ports, which are not visible in FIG. 1B. The module 120 includes a lifting attachment comprising a bar that may be used to lift the module 120 with a hoist for loading the module 120 onto the support structure 110. As shown in FIGS. 1A and 1B, the exemplary module 120 includes latching hooks (tabs) 122 that insert into complementary latching mechanisms 112 at the vehicle 110 (or at the support structure 110 in some examples) and which then lock into place by virtue of a suitable locking or latching mechanism, such as described elsewhere herein. The module 120 may also include an electrical port 124 that mates with a complementary electrical port 114 at the vehicle 100 (or at the support structure 110 in some examples) to provide power or signal routing to electronics in the module 120. The vehicle 110 may include one or more module sensors 118 for detecting the presence of the removable structural module 120, and the module 120 may likewise include one or more complementary sensor pairing devices 128, e.g., an electronic chip, a radio frequency identification (RFID) chip, a magnet structure of a particular configuration, etc., that permits the module sensor(s) 118 to detect or otherwise communicate with the sensor pairing device 128 on the module 120. As will be further discussed herein, the structural vehicle modular system provides for automatic identification of a predetermined type/category of an attachable/ removable structural module 120.

FIG. 2A illustrates a block diagram in side view of an exemplary reconfigurable electric vehicle according to an example of the disclosure, and FIG. 2B illustrates a block diagram in bottom view of the exemplary reconfigurable electric vehicle of FIG. 2A. As shown in FIGS. 2A and 2B, a vehicle 200 (e.g., the same as vehicle 100) such as an electric vehicle, which can be a hybrid vehicle, includes a body 202, wheels/tires 204, one or more motors 206, and a power system 208 including a battery pack and a power regulator system. The motor(s) 206 and power system 208 may be monitored and controlled by an onboard computer 222 via suitable electrical interfaces. The vehicle may also include an auxiliary power unit (APU) 210, which may also be monitored and controlled by the onboard computer 222, and may be in the form of, e.g., a gasoline, propane, alcohol or other fuel-driven electric generator that provides auxiliary power to the power system 208 for driving motor(s) 206. In examples, an APU 210 may be considered a removable structural module in the present disclosure. The vehicle 200 may also include a drive system 212 that couples rotational motion from the motor(s) 206 to the wheels 204 and that may be monitored and controlled by the onboard computer 222. In some examples, each wheel 204 may be driven by its own motor 206, in which case a drive system 212 may provide a suitable coupling to provide rotation motion from the motor 206 to the wheel 204. In other examples, a motor 206 may drive more than one wheel 204, in which case the drive system 212 may provide suitable coupling for providing rotational motion from the motor 206 to the wheels 204, such as through a suitable differential.

The vehicle 200 also includes a steering system 214, to provide, e.g., electrical steering, hydraulic steering, or combination thereof, which may also be monitored and controlled by the onboard computer 222. The vehicle 200 also includes suspension components 216, e.g., air actuated vehicle leveling and shock absorbers for adjusting ride height and ride dampening. The vehicle 200 also includes one or more instrument panels 218, e.g., in the form of flat panel, e.g., liquid crystal, electroluminescent, etc., displays, which may be monitored and controlled by the onboard computer 222. The vehicle also includes braking components 220, e.g., disks and other components for regenerative braking that may be monitored and controlled by computer system 222.

The vehicle 200 also includes one or more module sensors 224 for detecting the presence of a removable structural module 230 as well as one or more latching mechanisms 226, 228 for securing the module 230 to the vehicle 200 via respective latching mechanisms 236, 238 on the module 230. Such latching mechanisms may include simple fasteners such as bolts, or may include other suitable mechanisms such as over-center latches with locks, tab-in-slot latching mechanisms (e.g., similar to seat belt/safety belt locking mechanisms), and electromechanical automatic cinching latches such as commonly used on vehicle door locks and made of suitable strength/gauge materials to accommodate the weight and loads associated with expected vehicle uses and potential impacts. As described herein, multiple different types of removable structural modules 120, 230 may be utilized with a vehicle 100, 200. In examples, the module sensor(s) 224 may detect the presence of a particular type of module 120, 230 or a unique module 120, 230 of a particular type that has a unique identification number distinguishing it from other modules of any type. For example, the module sensor(s) 224 may detect a sensor pairing device 232 on the module 232, e.g., an electronic chip, a radio frequency identification (RFID) chip, a magnet structure of a particular configuration, etc., that permit the sensor(s) 224 to capture or generate a signal that permits the onboard computer 222 to determine the type and/or identification of a given removable module 120, 230. In another example, the sensor pairing device 232 and the sensor(s) 224 may comprise Bluetooth transceivers or other wireless devices that establish communication so as to permit the sensor(s) 224 (e.g., Bluetooth transceiver) to receive or generate a signal a signal that permits the onboard computer 222 to determine the type and/or identification of a given removable module 230. In addition, wireless transceivers disposed at (e.g., in or on or integrated into) the removable structural module 230 may pair and communicate not only with the onboard computer 222, but also with mobile computing devices such as smart phones, tablets, and other portable computerized devices, to provide diagnostics (e.g., verification of secure attachment, verification that access ports are secured and locked, etc.), information about the removable module 230 itself (e.g., environmental information such as internal temperature and humidity), information about the contents or loading of the removable structural module (e.g., identification of which packages remain in the module for delivery based on package sensors such as RFID sensors in the module 230), identification of any problematic load shifting based on a distribution (e.g., based on an array of load sensors integrated into support surfaces of the module 230), or other information such as imagery taken within or at the module 230 (e.g., to verify integrity of a load). In examples, power may be provided to the module 230 via interfaces between sensor(s) 224 and sensor pairing devices 232 and/or via suitable electrical interfaces and connectors located at, e.g., integrated into, the latching mechanisms 226, 228 and 236, 238.

Figure 3A:
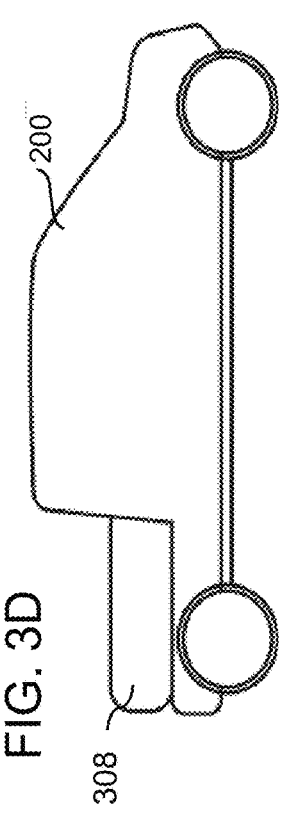
FIGS. 3A-3F illustrate exemplary removable module configurations for vehicles according to examples of the disclosure.
Figure 3B:
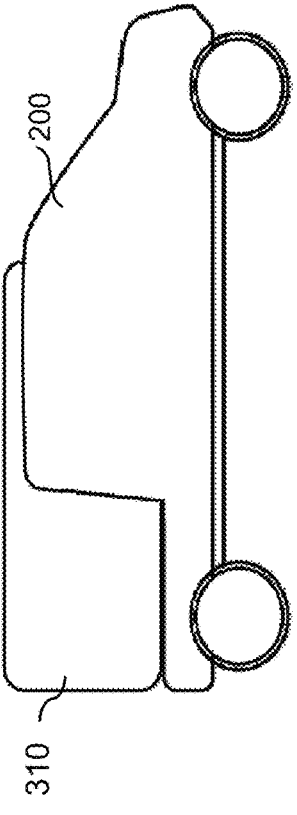
Figure 3C:
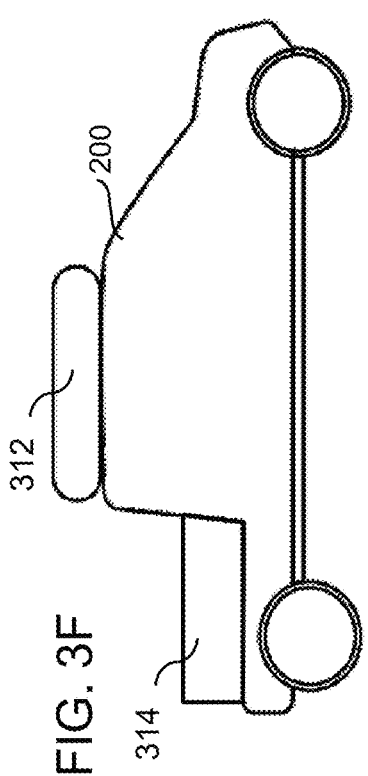
Figure 3D:
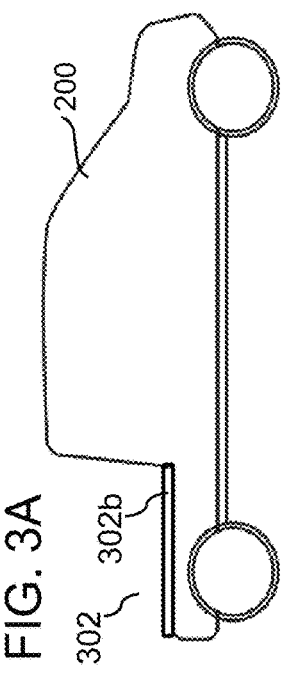
Figure 3E:
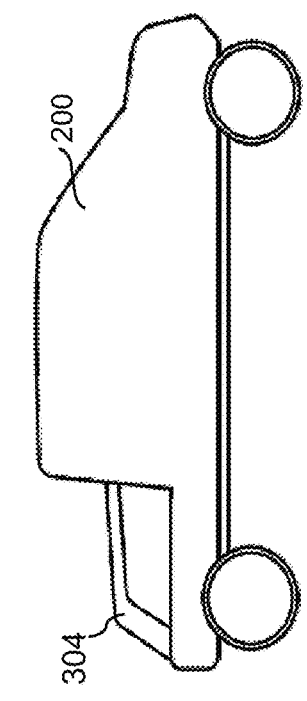
Figure 3F:
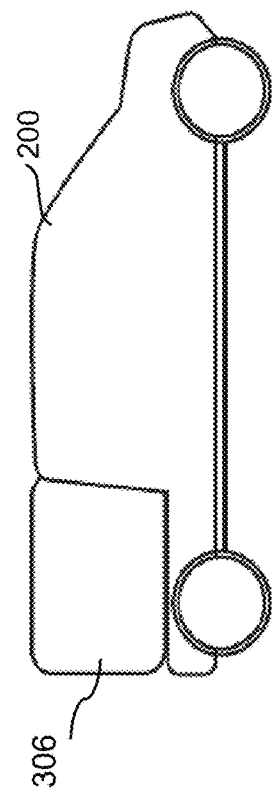

FIGS. 3A-3F illustrate exemplary removable and interchangeable modules that permit desired reconfiguration of a given vehicle 200 (which may be the same as vehicle 100) in a pool of vehicles to suit desired uses and needs. It will be appreciated that the examples illustrated in FIGS. 3A-3F are merely exemplary and not exhaustive, and that each of the examples may be paired with a vehicle 200 such as illustrated in FIGS. 2A and 2B, along with associated latching (securing) of the module to vehicle 200, sensing of the type and/or unique identification of the module, communication between the vehicle 200 and the module, power delivery to the module, or combination thereof. FIG. 3A illustrates an exemplary baseline or naked configuration 302 with either no removable module attached to the vehicle 200 or with a removable protective base insert 302b, which may be used with or without additional modules, e.g., to protect the underlying vehicle support surface from wear and tear associated with repeated removal and installation of different modules. FIG. 3B illustrates an exemplary removable side rail module 304, wherein side rails 304 may be inserted into receiving holes at the vehicle 200. FIG. 3C illustrates an exemplary removable roof-height enclosed module 306 (whose height is approximately that of the height of the roof of the vehicle 200), e.g., suitable for delivery applications. FIG. 3D illustrates an exemplary removable below-roof-height enclosed module 308, e.g., suitable for everyday cargo carrying needs for a typical user, and which provides good visibility through the rear window of the vehicle 200 and minimal blind spots. FIG. 3E illustrates an exemplary removable over-the-vehicle-roof recreational module 310 that may include a pop-up roof and is configured for camping. FIG. 3F illustrates an exemplary removable roof module 312 for cargo carrying at the roof of vehicle 200 and an exemplary removable open box module 314 for utility use, e.g., for hauling desired items such as refuse, appliances, building materials, etc. The modules 312 and 314 illustrated in FIG. 3F need not be used together and may be used separately. More generally, as illustrated in FIG. 3F more than one module may be configured and attached to a given vehicle 200 at one time. In the examples illustrated in FIGS. 2A-2B and 3A-3F, it can be observed that the removable structural modules of these examples are not trailers that are towed behind a vehicle but rather are removable modules that are releasably attached/secured to and supported by, i.e., carried by, the vehicle 200 itself using a releasable attachment in a releasable manner, e.g., such that when the module 230 is attached/secured so as to be transported by the moving vehicle 200 (i.e., during driving), the weight of the removable structural module 230 is fully supported by the vehicle 200.

FIG. 4A illustrates an exemplary support structure 410 configured to receive and support a removable structural module, e.g., module 120, 230 for a vehicle according to an example of the disclosure. As shown in the example of FIG. 4A the support structure 410 includes at opposing angled sides 413 a pair of load bearing support rails 416 on which the module 120 may be supported. Sides 413 and rails 416 may be the same as sides 113 and rails 116 in FIG. 1A. The rails 416 may be fabricated from strong alloy materials, for example, such as stainless steel to provide for adequate strength, wear resistance and corrosion resistance. In an example, as discussed further below, the rails 416 may support a set of rollers integrated at the bottom of the module 120, 230 wherein the rollers may be made from, e.g., a metal alloy such as stainless steel or other suitably strong and wear/corrosion resistant material. As shown in FIG. 4A, the sides 413 are angled from the vertical at an angle $\alpha1$. This angling of the sides 413 serves to provide a self-guiding mechanism that self corrects the position of the module 120, 230 when the module is loaded onto the support structure 110, e.g., when loaded from a first (vertical) direction. The angle $\alpha1$ may be any suitable angle that facilitates positioning of the module 120, 230 e.g., in the range of about 30-60 degrees, such as about 30 degrees, about 45 degrees, about 60 degrees, etc.

FIG. 4B illustrates a portion of the exemplary support structure for a removable structural module shown in FIG. 1A in an expanded, higher magnification view. As shown in FIG. 4B, the support structure 110 of FIG. 1A includes a flared portion 430 (which may be the same as flared portion 130 of FIG. 1A) at the angled side 413 that opens outwardly in a lateral direction. Thus, in addition to the angled sides 413 being oriented at an angle $\alpha1$ relative to a first (vertical) direction, the flared portion 430 of the angled side 413 is further angled at an angle $\alpha2$ relative to a second (horizontal) direction perpendicular to the first (vertical) direction. This angling of the sides 413 further serves to provide a self-guiding mechanism that self corrects the position of the module 120 when the module is loaded onto the support structure 110, e.g., when loaded from a second (horizontal) direction perpendicular to the first direction. As shown in FIG. 4B, the angle $\alpha2$ may vary continuously in the sense that the horizontal angling or flaring is curved (rounded). This is not necessary, however, and the horizontal angling/flaring may be achieved by a flat segment horizontally angled with respect to the horizontal direction parallel to the side of the vehicle. The angle $\alpha2$ may be any suitable angle that facilitates positioning of the module 120, e.g., in the range of about 30-60 degrees, such as about 30 degrees, about 45 degrees, about 60 degrees, etc.

FIG. 4C illustrates another exemplary support structure 450 configured to receive and support a removable structural module for a vehicle according to an example of the disclosure. In the example of FIG. 4C, support rails are not provided and the bottom flat surface 452 and the angled side surfaces 454 provide the support for the module 120. As discussed above the angling of the sides 454 provides a self-guiding mechanism that self corrects the position of the module 120 when the module is loaded onto the support structure 450.

Figure 6:
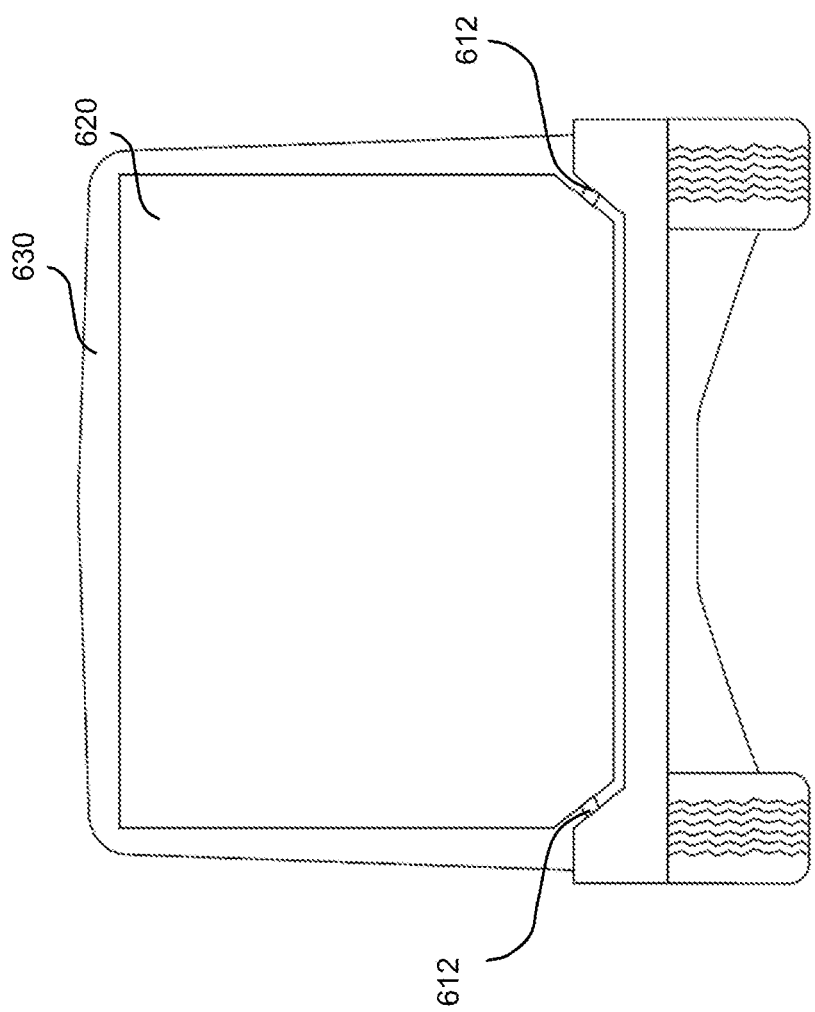
FIG. 6 illustrates a back view showing an exemplary removable structural module attached to an exemplary support structure and thereby mounted in a secure manner to an electric vehicle according to an example of the disclosure.

FIG. 5A illustrates the exemplary removable structural module 120 of FIG. 1B in a bottom-to-top reversed view according to an example of the disclosure. In other words, in FIG. 5A, the module is illustrated upside down to show exemplary bottom structure of the module 120. As shown in FIG. 5A, multiple rollers 510 are provided at an angled surface 513 near the bottom of the module 120. In an example, such rollers 510 may ride on top of support rails, such as support rails 116 shown in FIG. 1A. In another example shown in FIG. 5B, rollers 512 may be structured such that the rolling surface of the rollers 512 that contacts the support rails 416 is indented with an indentation 522 in a shape complementary to the shape of the support rails such that the rollers 512 straddle the support rails 416, a center of a roller 512 being aligned with a corresponding center of the support rail 416. Any suitable shape may be used in this regard for the indentation and support rail. In an example, a triangular or quasi-triangular shape has an advantage of being self guiding so as to self correct the alignment of the rollers relative to the support rail when the module 120 is being loaded onto the support structure. A rear view of an exemplary module 620 mounted in this fashion on a support structure using rollers 612 and support rails is shown in FIG. 6, though the support rails are hidden in FIG. 6 and are not visible. The outline of the vehicle cab 630 is also shown in FIG. 6 forward of the module 620.

FIGS. 7A and 7B illustrate exemplary approaches for loading and mounting a removable structural module 720 onto a support structure for mounting the module to a vehicle. FIG. 7A illustrates that a motorized crane 710 with a cable 712 may be used to lift and lower the module 720 vertically onto the support structure at the vehicle. FIG. 7B illustrates that a rolling cart 714 on which the module 720 is supported may be used to load the module 720 onto the support structure at the vehicle. It will be appreciated that the use of rollers at the module 720 are beneficial for such horizontal loading.

As illustrated in the examples of FIGS. 2A-2B and 3A-3F, different predetermined structural configurations of the vehicles may be provided by different, removable structural modules, e.g., removable cargo modules. Such modules may include, for example, a removable recreation module 310, a removable delivery module 306, 308, 312, a removable open box utility module 314, a removable flat bed support module 302b, and a removable side rail module 304. In addition, any of such modules may further include additional storage compartments and suitable attachment structures such as tie down hardware. Moreover, different predetermined types of removable structural modules may include, such as mentioned previously herein, wireless transceivers to communicate relevant information to a mobile computing device such as an application enabled smart phone at the vehicle, wherein such information may pertain to, for example, module configuration and status or may pertain to, for example, expected use of the vehicle based on the type of removable module configured with the vehicle.

In some examples, when a predetermined type of removable structural module is attached to (or configured with) the vehicle, the vehicle's onboard computer system 222 may automatically identify the type of module (or may receive such identification from electronics of the module itself) and set a predetermined feature set, e.g., in addition to/other than a cargo carrying capability of the module, based on the first vehicle being placed in the that configuration with that module type. The onboard computer 222 may select the first feature set based on detection of a particular type and/or unique identification of removable structural module, for example.

In examples, with reference to FIGS. 2A and 2B, the predetermined feature set can be automatically set at the vehicle by the onboard computer 222 of the vehicle 200 based on an identification of the first particular configuration with a sensor system, e.g., 224, 232, that automatically generates a signal indicative of the particular vehicle configuration associated with a given attached structural module. In another example, the predetermined feature set may be automatically set at the vehicle 200 by the onboard computer 222 of the vehicle 200 based on an identification of the first particular configuration through communication between the vehicle 200 and at least one of multiple removable modules 230, e.g., such as through communication of paired Bluetooth or other wireless transceivers at the removable module 230 and the vehicle 200.

In examples, the predetermined feature set may comprise one or more ride performance characteristics including one or more of a limitation on a maximum permissible acceleration, a firmness of ride of the vehicle, braking performance/sensitivity, a nominal suspension height, and an effective steering ratio. In this regard, after the onboard computer 222 identifies the type and/or unique identification of the particular configuration, e.g., module 230 (or the configuration, e.g., module, transmits its type to the onboard computer 222), the onboard computer 222 may choose appropriate vehicle driving performance characteristics suitable for the configuration and vehicle use. For example, if the module 230 attached to the vehicle is a delivery module, the onboard computer 222 may limit the acceleration of the vehicle 200 so as to avoid damaging merchandise in the delivery module, soften the ride by adjusting a suspension component 216, and provide normal braking performance and sensitivity and normal steering performance and sensitivity. In another example, where the particular configuration involves attachment of a recreational module for camping, vehicle performance characteristics may be altered in a predetermined way to account for the higher center of gravity of such a removable module, e.g., to place limits on speed, acceleration, etc. Onboard GPS may also monitor the location of the vehicle such that when the vehicle is determined by the onboard computer 222 to be in off-road conditions, the onboard computer 222 may adjust vehicle suspension components 216 to raise the vehicle height to facilitate avoidance of obstructions such as rocks, pot holes, etc. In an example of a naked configuration, the vehicle driving characteristics may be automatically set by the onboard computer 222 to provide for sport performance and handling, e.g., permissible high acceleration, quick steering response, quick braking response, etc. Of course, other traditional aspects of vehicle stability control and traction control may additionally operate in all such instances described above.

In examples, the predetermined feature may also comprise one or more human-machine interface (HMI) elements at the instrument panel(s) 218 including one or more adaptive display elements, one or more graphical user interface elements, and one or more audio rendering elements. In other words, interior features may be adjusted as well as driving performance or other characteristics. For example, for a delivery application, the delivery itinerary may be uploaded to the vehicle computer 222, in which case the first predetermined feature set may also comprise display functionality displayed at the instruction panel(s) 218 to reflect the status of deliveries, traffic routes/directions to facilitate delivery in high traffic contexts, wherein such functionality would not be displayed for other types of configurations associated with different types of modules. In another example, where the identified configuration, e.g., removable module, is that of a recreational camping module, HMI elements of weather alerts or imagery from exterior cameras in an off-road scenario may be displayed for safety concerns, as well as alert notifications from obstacle detection using suitable object detection sensors placed at suitable sensitivity for off-road use. In another example, a predetermined feature set may include automatically set vehicle interior lighting durations upon vehicle entry and environmental heating protocols based on particular vehicle configurations, e.g., such as in a delivery configuration to provide a comfortable cockpit for delivery drivers who repeatedly exit and reenter the vehicle, such as rapid, high-power heating upon vehicle reentry.

As described herein, in some aspects, a computer system 222 may be utilized to automatically identify the type of module (or may receive such identification from electronics of the module itself) and set a predetermined feature set, e.g., in addition to or other than a cargo carrying capability of the module. The computer system 222 may also communicate with sensors or other devices in removable structural module 230 as well as with mobile computing devices such as smart phones, tablets, other portable computerized devices, and a remote computerized monitoring system to record and communicate diagnostics (e.g., verification of secure attachment, verification that access ports are secured and locked, etc.), information about the removable module 230 itself (e.g., environmental information such as internal temperature and humidity), information about the contents or loading of the removable structural module (e.g., identification of which packages remain in the module for delivery based on package sensors such as RFID sensors in the module 230), identification of any problematic load shifting based on a detected load distribution (e.g., based on an array of load sensors integrated into support surfaces of the module 230), or other information such as imagery taken within or at the module 230, e.g., to verify integrity of a load. In that regard, computerized methods and systems described herein may be implemented using any suitable computer processing system with any suitable combination of hardware, software and/or firmware. The computer processing system 222 may execute software operations, program instructions or routines to implement communication, calculations, memory storage, and analyses described above. Such program instructions, accumulated data, and processed data may be stored one or more non-transitory computer-readable memories 110 and/or one or more data stores for in databases 112. Communications may be carried out according to a client server architecture whereby vehicles 100, 200 may access a monitoring system via one or more servers via one or more networks.

The computer processing system 222 may include element managers, real-time data buffers, conveyors, file input processors, database indices, data buffers and data managers for managing data and processing. The computer system 222 may also include one or more displays in the vehicle, display interfaces, input/output devices such as a keypad, microphone, touch screens and the like for permitting users to manage the system.

This written description describes exemplary embodiments of the invention, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The computerized methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply. In addition, as used in the description herein and throughout the claims that follow, the meaning of "about" and/or "approximately" refers to ±10% of the quantity indicated, unless otherwise indicated.

While the present invention has been described in terms of exemplary embodiments, it will be understood by those skilled in the art that various modifications can be made thereto without departing from the scope of the invention as set forth in the claims.

What is claimed is:

1. A modular system for an automotive vehicle configured to permit removal of a removable structural module from and reattachment to an automotive vehicle, the modular system comprising:

a vehicle body configured as a unitary body from the most forward end of the body to the most rearward end of the body;

a pair of front wheels and a pair of rear wheels connected to the vehicle body;

a removable structural module; and a support structure configured to receive and support the removable structural module and to permit the removable structural module to be releasably attached to an automotive vehicle;

a sensing arrangement configured to permit confirmation of secure attachment of the removable structural module to the vehicle and configured to permit identification of a predetermined type of the removable structural module; and a computer configured to identify the predetermined type of the removable structural module from among multiple possible predetermined types of removable structural modules;

wherein the removable structural module comprises multiple connecting structures that permit the removable structural module to be releasably secured to the automotive vehicle, wherein the computer is configured to automatically set at the automotive vehicle a predetermined first feature set from among a plurality of predetermined feature sets corresponding to the multiple possible predetermined types of removable structural modules based on the identification of the predetermined type of the removable structural module, the first predetermined feature set including one or more features selected from a limitation on a maximum permissible acceleration, a firmness of ride of the vehicle, braking sensitivity, a suspension height of a variable suspension, and sport handling.

2. The modular system of claim 1, wherein the support structure is configured to be attached to the automotive vehicle, and wherein the removable structural module is secured to the automotive vehicle at least in part by virtue of being secured to the support structure.

3. The modular system of claim 1, wherein the support structure comprises a pair of load bearing support rails that support the removable structural module.

4. The modular system of claim 3, wherein the removable structural module comprises multiple rollers configured to ride the pair of load bearing support rails.

5. The modular system of claim 4, wherein multiple rollers have recesses in rolling surfaces thereof that mate with load bearing support rails such that the rollers straddle the load bearing support rails.

6. The modular system of claim 5, wherein load bearing support rails project inward toward a middle of the support structure such that the load bearing support rails confine lateral movement of the removable structural module in a direction transverse to a rolling direction associated with the rollers of the removable structural module.

7. The modular system of claim 1, wherein the multiple connecting structures of the removable structural module are selected from among over-center latches with locks, tab-in-slot latching mechanisms, and electromechanical latches.

8. The modular system of claim 1, wherein the computer is configured to confirm secure attachment of the removable structural module to the automotive vehicle.

9. The modular system of claim 1, wherein the computer comprises an on-board computer of the automotive vehicle.

10. The modular system of claim 1, wherein the computer comprises a mobile computing device.

11. The modular system of claim 10, wherein the mobile computing device comprises a smart phone or a tablet.

12. A modular system for an automotive vehicle configured to permit removal of a removable structural module from and reattachment to an automotive vehicle, the modular system comprising:
  a removable structural module; and
  a support structure configured to receive and support the removable structural module and to permit the removable structural module to be releasably attached to an automotive vehicle;
  a sensing arrangement configured to permit confirmation of secure attachment of the removable structural module to the vehicle and configured to permit identification of a predetermined type of the removable structural module; and
  a computer configured to identify the predetermined type of the removable structural module from among multiple possible predetermined types of removable structural modules;
  wherein the removable structural module comprises multiple connecting structures that permit the removable structural module to be releasably secured to the automotive vehicle,
  the support structure being configured to permit the removable structural module to be releasably attached at an exterior of a vehicle body of the automotive vehicle, wherein the vehicle body of the automotive vehicle is configured as a unitary body from the most forward end of the body to the most rearward end of the body, a pair of front wheels and a pair of rear wheels being connected to the vehicle body.

13. The modular system of claim 12, wherein the support structure is configured to be attached to the automotive vehicle, and wherein the removable structural module is secured to the automotive vehicle at least in part by virtue of being secured to the support structure.

14. The modular system of claim 12, wherein the support structure comprises a pair of load bearing support rails that support the removable structural module.

15. The modular system of claim 14, wherein the removable structural module comprises multiple rollers configured to ride the pair of load bearing support rails.

16. The modular system of claim 15, wherein multiple rollers have recesses in rolling surfaces thereof that mate with load bearing support rails such that the rollers straddle the load bearing support rails.

17. The modular system of claim 16, wherein load bearing support rails project inward toward a middle of the support structure such that the load bearing support rails confine lateral movement of the removable structural module in a direction transverse to a rolling direction associated with the rollers of the removable structural module.

18. The modular system of claim 12, wherein the multiple connecting structures of the removable structural module are selected from among over-center latches with locks, tab-in-slot latching mechanisms, and electromechanical latches.

19. The modular system of claim 12, wherein the computer is configured to confirm secure attachment of the removable structural module to the automotive vehicle.

20. The modular system of claim 12, wherein the computer comprises an on-board computer of the automotive vehicle.

21. The modular system of claim 12, wherein the computer comprises a mobile computing device.

22. The modular system of claim 21, wherein the mobile computing device comprises a smart phone or a tablet.

23. A structurally reconfigurable automotive vehicle, comprising:
  a vehicle body configured as a unitary body from the most forward end of the body to the most rearward end of the body;
  a pair of front wheels and a pair of rear wheels connected to the vehicle body;
  a motor;
  a drive system;
  a removable structural module;
  a sensing arrangement configured to permit confirmation of secure attachment of the removable structural module to the automotive vehicle and configured to permit identification of a predetermined type of the removable structural module; and
  a computer configured to identify the predetermined type of the removable structural module from among multiple possible predetermined types of removable structural modules;
  the removable structural module comprising multiple connecting structures that permit the removable structural module to be releasably secured to the automotive vehicle at an exterior of the automotive vehicle.

24. The modular system of claim 1, wherein, when the removable structural module is not attached to the automotive vehicle, the computer is configured to automatically set said sport handling at the automotive vehicle for driving on roadways other than off-road use.

\* \* \* \* \*